United States Patent [19]
Fogg et al.

[11] Patent Number: 5,167,260
[45] Date of Patent: Dec. 1, 1992

[54] DUCT CORE WITH STRENGTHENING TAPE

[75] Inventors: Clifford A. Schroeder, Westlake; Ralph L. Fogg, Chatsworth, both of Calif.

[73] Assignee: C. A. Schroeder, Inc., San Fernando, Calif.

[21] Appl. No.: 211,067

[22] Filed: Jun. 20, 1988

Related U.S. Application Data

[60] Continuation of Ser. No. 898,765, Aug. 14, 1986, abandoned, which is a continuation of Ser. No. 644,199, Aug. 23, 1984, abandoned, which is a division of Ser. No. 456,336, Jan. 6, 1983, Pat. No. 4,478,657.

[51] Int. Cl.$^5$ ............................................ F16L 11/08
[52] U.S. Cl. ..................................... 138/131; 138/122; 138/119; 138/134
[58] Field of Search .............. 138/113, 114, 118, 119, 138/121, 122, 131, 132, 133, 134, 139, 141, 172, 177, 178, DIG. 1; 156/86, 64, 143, 390

[56] References Cited

U.S. PATENT DOCUMENTS

| | | | |
|---|---|---|---|
| 14,046 | 1/1916 | Joseph | 138/119 |
| 1,882,151 | 10/1932 | Logerblade | 138/143 X |
| 2,365,286 | 12/1944 | Moseley et al. | 138/131 X |
| 2,401,949 | 6/1946 | Mariner | 138/131 |
| 4,098,298 | 7/1978 | Vohrer | 138/133 X |
| 4,172,474 | 10/1979 | Stahl | 138/132 |
| 4,224,463 | 9/1980 | Koerber et al. | 138/122 X |

FOREIGN PATENT DOCUMENTS 560270  3/1928  United Kingdom ................ 138/121

Primary Examiner—James E. Bryant, III
Attorney, Agent, or Firm—David O'Reilly

[57] ABSTRACT

Strengthening the core of an insulated flexible duct formed of a helical wire wrapped with a flexible material with reinforcing tape. Strengthening tape is applied to the surface of the duct along its entire length. The apparatus for applying the strengthening tape is a tray having adjustable wiping arms. The wiping arms stretch the duct out as it is pulled through the tray. A roll of tape is mounted adjacent to the wiper arms and is automatically applied as the duct is pulled along the tray through the wiper arms. At least two wiper arms and continuous strips of tape along the longitudinal surface of the duct core are preferred.

4 Claims, 2 Drawing Sheets

DUCT CORE WITH STRENGTHENING TAPE

This is a continuation of co-pending application Ser. No. 898,765 filed on Aug. 14, 1986, now abandoned, which is a continuation of application Ser. No. 644,199 filed on Aug. 23, 1984, now abandoned, which is a divisional of application Ser. No. 456,336, filed on Jan. 6, 1983, now U.S. Pat. No. 4,478,657, dated Oct. 23, 1984.

FIELD OF THE INVENTION

This invention relates to insulated flexible duct and more particularly relates to improvements in forming and strengthening the wire reinforced core.

BACKGROUND OF THE INVENTION

Flexible insulated ducts are formed of a wire reinforced core wrapped in a blanket of insulating material covered with a flexible sleeve. The core is formed of a continuous coil of wire, usually covered by a flexible plastic material. Methods and apparatus for forming such ducts are shown in U.S. Pat. Nos. 3,216,459 and 4,351,682 incorporated herein by reference.

A problem with many of the synthetic plastic materials used to form the core is that while they may have high stretch resistance (i.e. tensile strength), they often have very low tear resistance. That is, while these materials may have high tensile strength, if a tear or cut begins it can quickly migrate or spread until the entire core unravels. Thus, a tear once started may continue to spread until the entire reinforcing wire helix comes apart, rendering the insulated duct useless. It would be advantageous if such tears or cuts could be stopped from spreading. Small tears, if prevented from spreading, would have little effect on the efficiency or function of the insulated duct.

Therefore it is one object of the present invention to strengthen the wire reinforced flexible duct core to prevent tears from spreading.

Another object of the present invention is to strengthen a flexible duct core by applying longitudinal strips of adhesive tape in intimate contact with flexible plastic material forming the duct core.

SUMMARY OF THE INVENTION

This purpose of the present invention is to strengthen a flexible duct core to prevent the duct core from coming apart or unraveling when small tears occur. The duct core is reinforced with a strip of strengthening adhesive tape longitudinally applied along its entire length. At least two strips of strengthening adhesive tape are applied along the length of the duct core. The number of strips of adhesive tapes depends upon the diameter of the duct core with more strips of tape used for larger duct core.

For small diameter ducts, two strips of strengthening tape are applied on opposite sides while for larger duct, preferably three or four strips of tape are applied, approximately equally spaced around the diameter.

The flexible duct core is comprised of a continuous helical coil of reinforcing wire wrapped with flexible plastic strip material. The flexible plastic strip material is bonded around the helical coil to form a compressible flexible tube. The flexible duct core is strengthened along its entire length with longitudinal strips of adhesive tape to prevent unraveling of the wrapped flexible plastic material should a tear in the plastic occur. At least one strip of adhesive tape is pressed firmly in intimate contact with the flexible plastic strip material between adjacent helical coils. A high tensile strength polyolefin tape having a pressure sensitive acrylic adhesive is preferred.

For small diameter duct two strips of reinforcing tape should be sufficient while for larger ducts more strips of tape may be needed. The strips of tape are, preferably equally spaced around the circumference.

In order to apply the strengthening tape firmly and evenly in intimate contact along substantially the entire length of the duct core it must be axially stretched tightly. Since this flexible duct core is normally stretched tightly lengthwise to test material bonds immediately after manufacture this was found to be a convenient time to apply the strengthening tape. Thus to apply the tape, rolls are positioned adjacent wipers that firmly press the tape along the side of the flexible duct as it is stretched tightly to test the bonds.

The above and other objects, advantages and novel features of the invention will be fully understood from the following detailed description when considered in conjunction with the accompanying drawings in which:

DETAILED DESCRIPTION OF THE INVENTION

Figure 1:
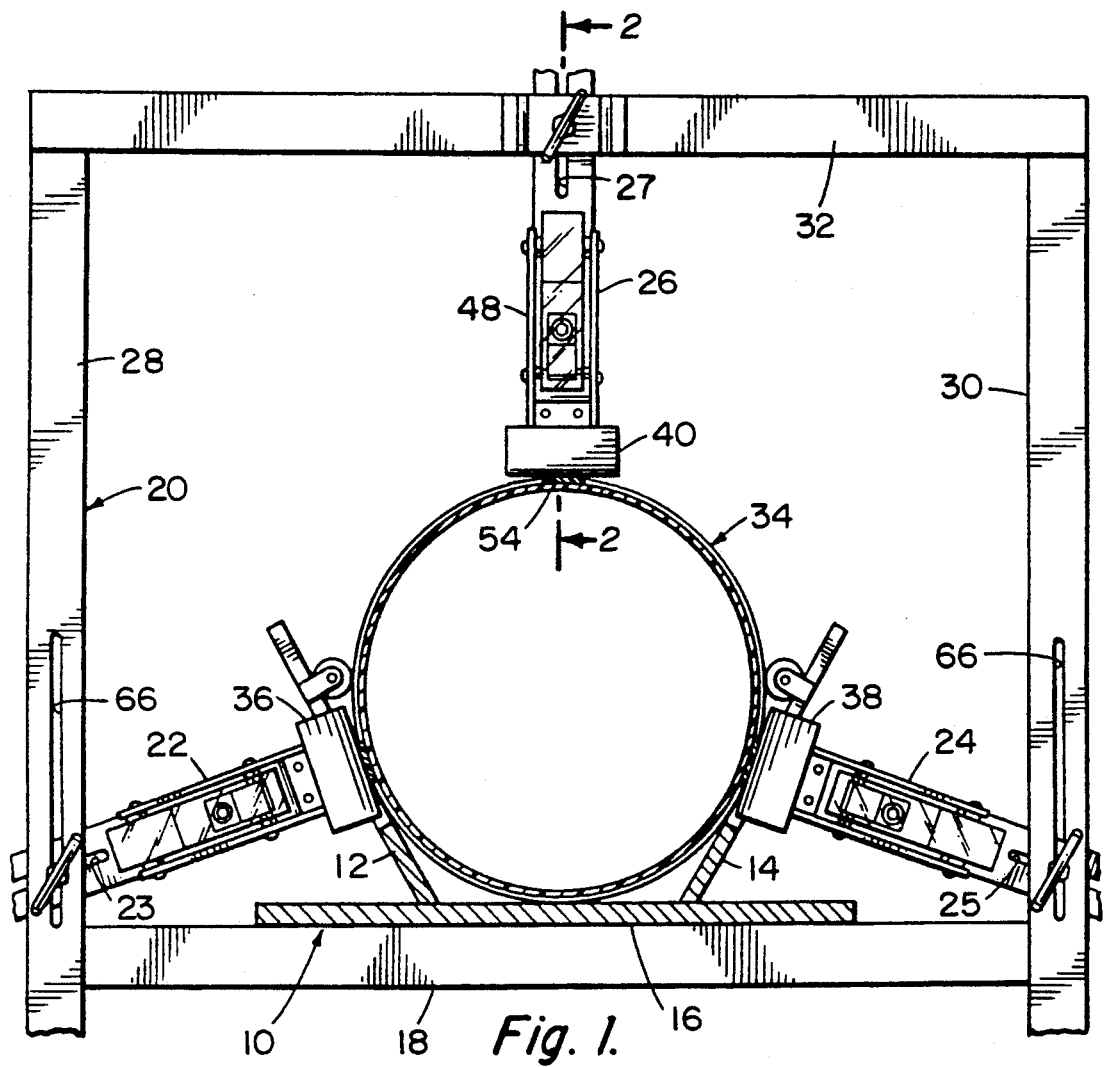
FIG. 1 shows how the strengthening tape is applied and pressed firmly in contact with the plastic material from the duct core along its length.

As shown in FIG. 1 the reinforcing tape is firmly applied using a tray generally indicated at 10 having an elongate trough formed by angled members 12 and 14 supported on a bed 16. The tray 10 is supported along its length at various points by cross members 18. The tray 10 has a length sufficient to stretch a section of flexible duct core out to near its full length.

Positioned along the length of the tray 10 is a frame 20 for supporting arms 22, 24 and 26. The frame 20 is attached to cross member 18 and has upright members 28 and 30 and cross member 32. Preferably the frame 20 is positioned approximately mid-way along the length of the tray 10. The trough formed by the angled members 12 and 14 has a space or interruption so that the arms 22 and 24 may engage the sides of a flexible duct core 34. Each arm 22, 24, 26 respectively is radially adjustable with the arms 22 and 24 also being vertically adjustable. Slots 23, 25, 27 in each arm respectively allow radial adjustment.

Figure 3:
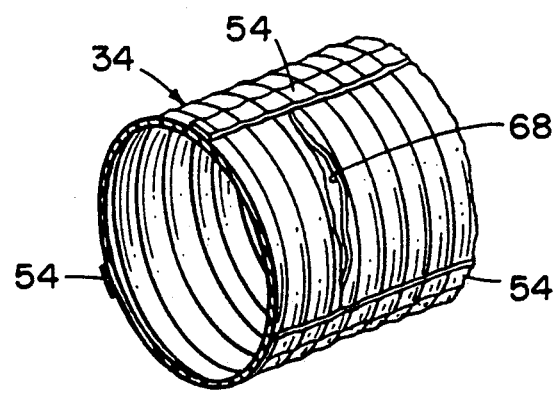
FIG. 3 illustrates a section of flexible duct core having a tear after strengthening tape has been applied.
Figure 2:
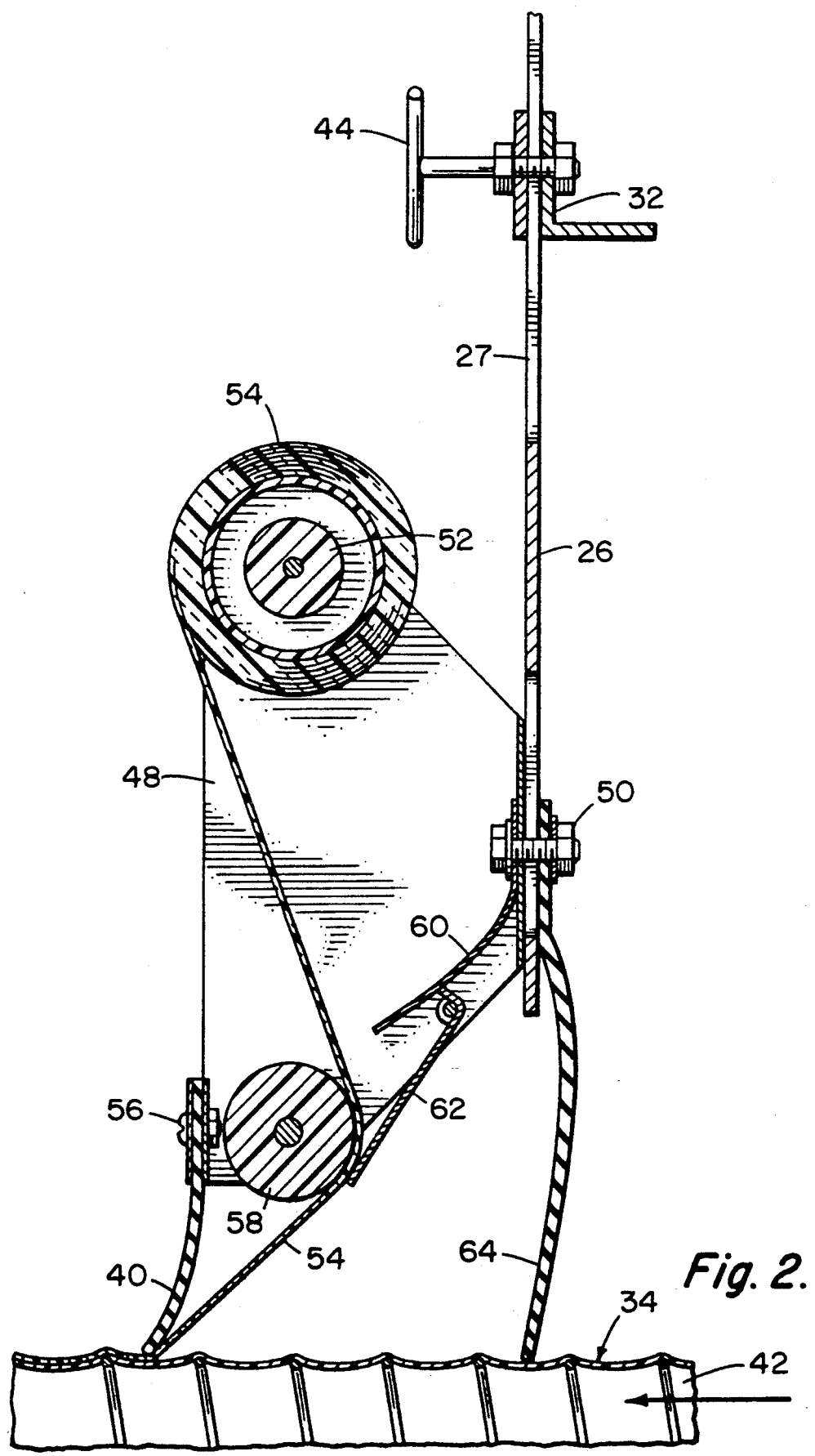
FIG. 2 is a sectional view taken at 2—2 of FIG. 1 and shows how the tape is firmly pressed in contact with the flexible plastic material.

Each of the arms 22, 24 and 26 is provided with at least one resilient wiper 36, 38 and 40 respectively for engaging and following the contour of the flexible duct core 34. As the flexible duct core 34 is pulled from one end of the tray 10 through the arms 22, 24 and 26 to the other end of the tray (not shown), the arms follow the contour of the duct stretching it tightly (FIG. 3). The wiper arms are adjustably attached to the frame 32 with wing bolt 44 to accommodate different diameter ducts.

Each arm has a tape dispenser 48 securely bolted to the arm at 50. A roll of tape 54 is mounted on roller 52 in dispenser 48. Wiper 40 is securely attached to the lower end of the dispenser 48 on each arm by a screw 36. As the flexible duct core is moved in the direction indicated by the arrow, each wiper 40 follows the contour of the duct, stretching the duct tightly between the coils of reinforcing wire 42. Wipers 40 simultaneously apply the tape 54 along the longitudinal surface of the flexible duct core 34. The tape 54 is fed from the roller 52 under second roller 58 and under wiper 40 to be pressed securely against the side of the flexible duct core 34. Pressure spring 60 and pressure bracket 62 apply a light pressure to keep the tape properly positioned.

To assist in prestretching the flexible duct core, a second wiper 64 may be provided on each arm also secured to the arm 26 by the bolt 50. The second wiper 64 prestretches the flexible duct core 34 before it reaches the tape and first wiper 40. Thus, the web of material between each coil of wire 42 is stretched prior to reaching the tape. This assures the tape being firmly adhered to the side of the flexible duct consistently along its entire length.

As can be seen in FIGS. 1 and 3, three strips of tape are being applied. However, for smaller duct sizes only two strips of tape will be necessary. Thus, slots 66 in vertical members 28 and 30 of frame 20 permit arms 22 and 24 to be adjusted vertically to engage the duct on opposite sides. For large duct (e.g. 12 to 20 inches) the third arm 26 is utilized to apply a third strip of tape. Obviously, a forth strip at the bottom could be added, if desired.

The tape is preferably a plastic tape having a pressure sensitive adhesive which has high tensile strength. For example, a polyolefin tape, having an acrylic adhesive, is suitable. Another suitable tape is strapping material formed of a glass fabric reinforced tape having a pressure sensitive adhesive.

As can be seen in FIG. 3, three strips of tape have been applied to strengthen the material wrapped around the wire reinforced core 34. This prevents tears such as that shown at 68 from spreading to unravel the reinforcing wire 42, effectively ruining the flexible insulated duct formed with this core.

Thus there has been described flexible duct core strengthening by applying strips of reinforcing tape over substantially the entire length. The reinforcing strips of tape are pressed firmly in contact with the flexible plastic strip material. Apparatus for applying the tape is adjustable to accommodate different diameter duct core.

This invention is not to be limited to the embodiment shown in the drawings and described in the description, which is given only by way of example and not of limitation but only in accordance with the scope of the appended claims.

What is claimed is:

1. A flexible duct core comprised of a continuous helical coil of reinforcing wire spirally wrapped with a flexible plastic strip material, bonded around said helical coil of reinforcing wire thereby forming a compressible flexible tube including:

means for strengthening said flexible duct core to prevent unravelling of said spirally wrapped flexible plastic material between helical coils of said reinforcing wire by a tear in said flexible plastic strip material; said reinforcing means comprising at least one longitudinal strip of high tensile strength flexible adhesive tape pressed firmly in intimate contact with said flexible plastic strip material between adjacent helical coils of said reinforcing wire along substantially the entire length of said flexible tube; whereby said flexible plastic strip material is prevented from unravelling should a tear occur in said flexible plastic strip material between adjacent helical coils of said reinforcing wire.

2. The duct core according to claim 1 in which there are at least two strips of reinforcing adhesive strengthening tape circumferentially spaced apart along substantially the entire length of said core.

3. The flexible duct core according to claim 2 in which there are three equally spaced longitudinal strips of said reinforcing adhesive strengthening tape along substantially the entire length of said flexible duct core.

4. The duct core according to claim 3 in which said tape is a high tensile strength polyolefin tape having a pressure sensitive acrylic adhesive.

* * * * *